(12) United States Patent
Niemi et al.

(10) Patent No.: US 8,896,614 B2
(45) Date of Patent: Nov. 25, 2014

(54) METHOD AND APPARATUS FOR BROWSING IMAGES

(75) Inventors: Sami Niemi, Skanör (SE); Martin Jacobsson, Lund (SE)

(73) Assignee: Mobile Imaging in Sweden AB, Lund (SE)

(*) Notice: Subject to any disclaimer, the term of this patent is extended or adjusted under 35 U.S.C. 154(b) by 591 days.

(21) Appl. No.: 13/002,362

(22) PCT Filed: Jul. 8, 2009

(86) PCT No.: PCT/SE2009/000361
§ 371 (c)(1),
(2), (4) Date: Mar. 15, 2011

(87) PCT Pub. No.: WO2010/005361
PCT Pub. Date: Jan. 14, 2010

(65) Prior Publication Data
US 2011/0148932 A1    Jun. 23, 2011

Related U.S. Application Data

(60) Provisional application No. 61/078,998, filed on Jul. 8, 2008.

(51) Int. Cl.
*G09G 5/36* (2006.01)
*G06F 17/30* (2006.01)

(52) U.S. Cl.
CPC ................................ *G06F 17/30274* (2013.01)
USPC ........................... 345/557; 345/684; 345/687

(58) Field of Classification Search
USPC ........................................................ 345/687
See application file for complete search history.

(56) References Cited

U.S. PATENT DOCUMENTS 5,263,136 A * 11/1993 DeAguiar et al. ............. 345/538
6,281,986 B1 * 8/2001 Form ............................. 358/403

(Continued)

FOREIGN PATENT DOCUMENTS

EP        1 727 032 A2    11/2006
EP     2007/011616 A2     1/2007

OTHER PUBLICATIONS

International Search Report: PCT/SE2009/000361.

(Continued)

*Primary Examiner* — Kee M Tung
*Assistant Examiner* — William Beutel
(74) *Attorney, Agent, or Firm* — Alston & Bird LLP (57) ABSTRACT

The present invention relates to a method for browsing images and an Image browser. The browsing is performed on a display of an electronic device having an image cache and includes the acts of determining an image, from accessible images not already stored in the image cache, being more likely to be displayed during the browsing than one image already stored in the image cache, storing the determined image in the image cache, shifting images presented on the display in response to a user input and at an image shifting rate of S. Said shifting images includes reading image data from the image cache and present the image on the display. The image browser includes a display, a dynamic Graphic User Interface, GUI, generator arranged to present images in accordance with a specific layout and to shift images at a specific image shifting rate S, an image cache arranged to temporarily store a plurality of images for use by the dynamic GUI generator, an access to a data storage, and an image retriever arranged to retrieve an image from the data storage and place it in the cache in case of the image retriever discovers an image in the data storage that is not present in the image cache and that is more likely to be displayed than one of the images present in the image cache. The image shifting rate S is frequently updated and is proportional to the present number of images in the image cache that are likely kept for browsing.

20 Claims, 5 Drawing Sheets

(56) References Cited

U.S. PATENT DOCUMENTS

| | | |
|---|---|---|
| 6,337,694 B1 | 1/2002 | Becker et al. |
| 6,720,971 B1 * | 4/2004 | Yamamoto et al. ........... 345/581 |
| 6,771,279 B2 | 8/2004 | Syukri |
| 6,873,329 B2 | 3/2005 | Cohen et al. |
| 6,904,176 B1 * | 6/2005 | Chui et al. .................... 382/240 |
| 7,039,751 B2 * | 5/2006 | Bentz ................................ 711/3 |
| 7,054,917 B1 * | 5/2006 | Kirsch et al. .................. 709/217 |
| 7,962,942 B1 * | 6/2011 | Craner ............................ 725/88 |
| 8,189,902 B1 * | 5/2012 | Carson .......................... 382/141 |
| 2004/0217980 A1 * | 11/2004 | Radburn et al. ............... 345/672 |
| 2005/0243097 A1 * | 11/2005 | Cohen et al. .................. 345/531 |
| 2007/0013708 A1 * | 1/2007 | Barcklay et al. .............. 345/557 |
| 2007/0252834 A1 * | 11/2007 | Fay ................................ 345/428 |
| 2007/0273702 A1 * | 11/2007 | Ishii .............................. 345/557 |
| 2008/0155461 A1 | 6/2008 | Ozaki |

OTHER PUBLICATIONS

Written Opinion for International Application No. PCT/SE2009/000361 mailed Oct. 13, 2009.

International Preliminary Report on Patentability for International Application No. PCT/SE2009/000361 issued Jan. 11, 2011.

* cited by examiner

METHOD AND APPARATUS FOR BROWSING IMAGES

TECHNICAL FIELD

The present invention relates to a method for browsing through digitally stored images and to an image browser.

BACKGROUND

The normal method used today for browsing digitally stored images is to find out which image to view next, request decoding of that image, and displaying it, and then start over again. In most applications this may result in slow and/or jerky presentation of the images, which may result in an unpleasant user experience or even be straining for the user. Hence, the known method do not produce a pleasant and/or smooth user experience.

SUMMARY

It is an object of the present invention to improve the browsing of digitally stored images and make it less straining for the user.

According to one aspect of the invention the above object is achieved by a method according to claim 1 and by an image browser according to claim 15. Embodiments of the invention are disclosed in the dependent claims.

In particular a method for browsing images, on a display of an electronic device having an image cache, comprises determining an image, from accessible images not already stored in the image cache, being more likely to be displayed during the browsing than one image already stored in the image cache, storing the determined image in the image cache, shifting images presented on the display in response to a user input and at an image shifting rate of S, wherein said shifting images includes reading image data from the image cache and present the image on the display, wherein the image shifting rate S is frequently updated and is proportional to the present number of images in the image cache that are likely kept for browsing.

The invention allows faster image browsing speeds through active caching. However, to achieve a maximum image viewing performance, one has to consider a list of images rather than a single image to be decoded.

The invention provides a fast and smooth image browsing through the active image cache, which is continuously filled with new images. The cache actively communicates what image browsing speed can be used to render next images based on the amount of relevant cached images. This allows for fast browsing speeds when cache contains relevant cached images, while smoothly transitioning to a slower browsing speed when the cache contents are becoming less relevant for the next images to be viewed, and ultimately decreasing the browsing speed to the maximum non-cached speed.

As the speed is controlled based on the contents of cache it will make sure that the speed does not exceed a speed where there is no image content ready to be displayed, and one would have to display a "loading" placeholder image.

In one embodiment of the invention the method further comprises downscaling the determined image before storing it in an image cache.

According to a further embodiment of the invention the decoding of the determined image is performed on an image in a cache including thumbnails, metadata, or a JPEG-image that is scaled by means of an index features allowing fast and or random access to portions of the image.

In yet another embodiment the method further comprises decoding the determined image before storing it in an image cache.

According to another embodiment the storing of the determined image in an image cache may be performed on images from a cache of downscaled images.

According to yet another embodiment an image being deemed more likely to be displayed than another image if a spatial distance between the image and a current pivot image is lower than the spatial distance between said another image and the pivot image, wherein the spatial distance is a distance between images in the presently used display layout presenting the images, and wherein the pivot image is defined as the essentially central image of the presently displayed layout.

According to another embodiment an image being deemed more likely to be displayed than another image if a distance in a data structure between the image and a current pivot image is lower than the distance between said another image and the pivot image, where the pivot image is defined as the essentially central image presently displayed.

In yet another embodiment shifting images includes shifting out an image visible on the display from the display and shifting in an image from the image cache to the display.

In another embodiment image shifting rate S is a rate of new images being shifted in to the display.

In a further embodiment the image shifting is animated.

According to another embodiment the displaying of an image from the image cache is performed via a second cache of at least 3 images to enable smooth animations.

In another embodiment the second cache is texture memory of a graphics accelerator.

In yet another embodiment storing the image in an image cache includes decoding the image and encoding the decoded image by means of an encoding scheme compressing the size of the image, but still enabling quick decoding for displaying.

According to another embodiment the image shifting rate S is a rate of new images being shifted in to the display and wherein a caching rate Sl is the rate of which the electronic device is able to perform the act of determining an image, retrieving said image, and storing the image in the image cache, wherein a desired maximum image shifting rate Sc is a predetermined fastest image shifting rate to be used when browsing the images, wherein a parameter U indicates a relation between useful and not useful images in the cache, and wherein S=Sl+(Sc−Sl)*U.

According to one embodiment essentially simultaneously new images are continuously provided to the image cache as long as they are more relevant than the existing images in the cache.

According to another aspect of the invention an image browser comprises a display, a dynamic Graphic User Interface, GUI, generator arranged to present images in accordance with a specific layout and to shift images at a specific image shifting rate S, an image cache arranged to temporarily store a plurality of images for use by the dynamic GUI generator, an access to a data storage, and an image retriever arranged to retrieve an image from the data storage and place it in the cache in case of the image retriever discovers an image in the data storage that is not present in the image cache and that is more likely to be displayed than one of the images present in the image cache, wherein the image shifting rate S is frequently updated and is proportional to the present number of images in the image cache that are likely kept for browsing.

In one embodiment the image browser further comprises input means arranged to receive a direction indication and to send a signal representing this direction indication to the dynamic GUI generator, wherein the dynamic GUI generator is arranged to browse in a direction indicated by the signal from the input means.

In another embodiment the image browser further comprises a second cache arranged to cache image data from the image cache, wherein the dynamic GUI generator is arranged to present images from the second cache.

In a further embodiment the image shifting rate S is a rate of new images being shifted in to the display and wherein a caching rate Sl is the rate of which the electronic device is able to perform the act of determining an image, retrieving said image, and storing the image in the image cache, wherein a desired maximum image shifting rate Sc is a predetermined fastest image shifting rate to be used when browsing the images, wherein a parameter U indicates a relation between useful and not useful images in the cache, and wherein $S=Sl+(Sc-Sl)*U$.

According to another embodiment the image retriever includes a decoder arranged to decode image data accessed from a data storage means.

According to yet another embodiment the image retriever includes an encoder arranged to encode image data to be stored in the cache.

BRIEF DESCRIPTION OF THE DRAWING

Other features and advantages of the present invention will become apparent from the following detailed description of a presently preferred embodiment, with reference to the accompanying drawings, in which.

DETAILED DESCRIPTION

The invention relates to a method and an image browser, which is arranged to implement the method, providing fast and smooth image browsing using an active predictive image cache. Possible applications for the invention are image viewing in a photo album, or when requesting images from a remote server.

The active predictive image cache is arranged to actively balance the maximum image browsing speed presented to the user at any time and the capacity of the cache to deliver continuous flow of images without ever having the cache running out of images to be displayed. The browsing speed may be seen as the number of images being shifted in to the display per time unit, The image browser may be included in an electronic device. Some examples of electronic devices that may include an image browser are handheld electronic devices, e.g. mobile phones, Personal Digital Assistants (PDAs), palm computers, watches, dedicated image browsers, photo viewers etc, digital image frames, laptop computers, desktop computers, etc.

Figure 1:
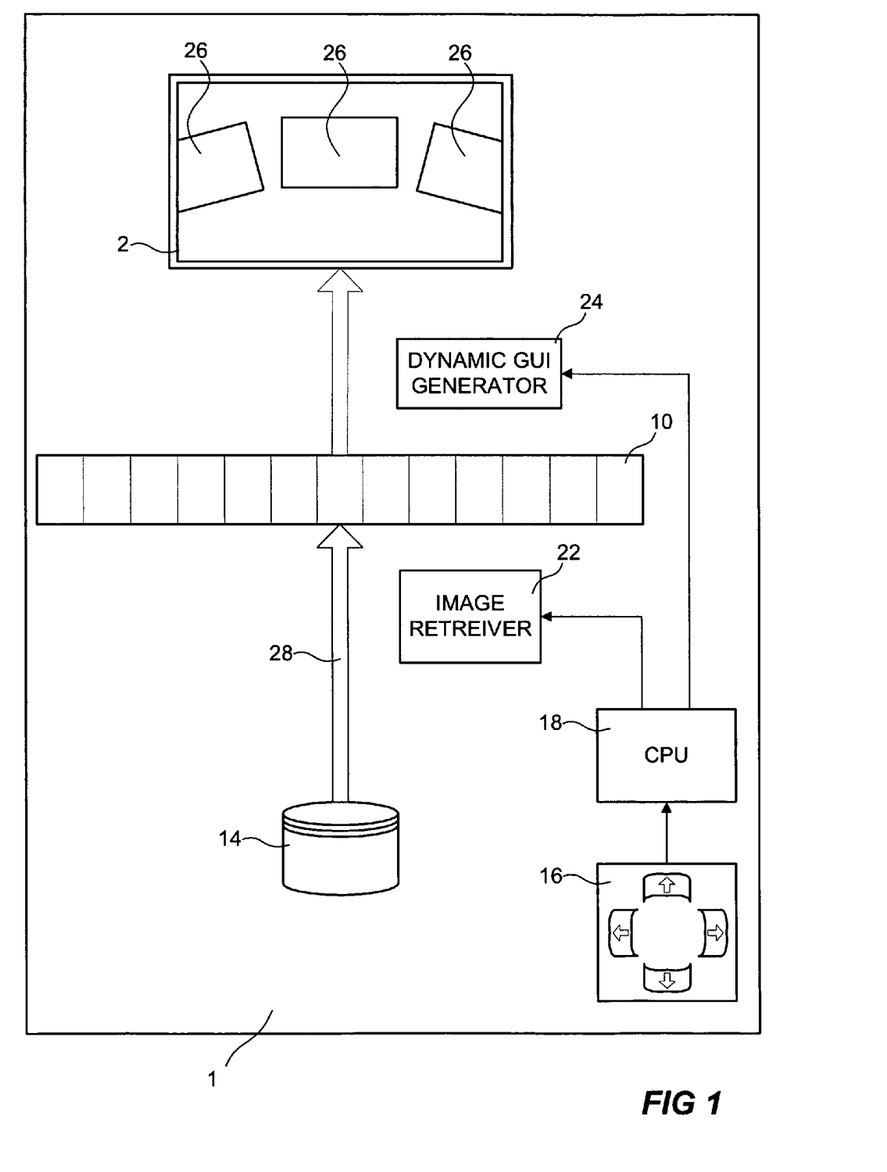
FIG. 1 shows a schematic view of an image browser according to one embodiment of the invention.

According to one embodiment of the invention, see FIG. 1, the image browser 1 includes a display 2, a dynamic Graphic User Interface (GUI) generator 24, an image cache 10, an image retriever 22, an access path 28 to a data storage means 14, input means 16 and a CPU 18.

The data storage means 14 may be incorporated in the image browser 1 or in the electronic device incorporating the image browser and may be accessed via an internal bus 28 or it may be an external storage device accessed via a network connection, a USB-connection, a Firewire connection, etc. Moreover, the data storage means 14 is arranged to store images to be presented on the display 2 and may be of any type of memory known to the skilled person, e.g. a hard drive, a solid state drive, a solid state memory, a Flash memory, a Random Access Memory, etc. The image cache 10 is arranged to temporarily store image data relating to images that is likely to be presented and may be implemented in a fast and volatile memory, e.g. any type of fast Random Access Memories, arranged in the electronic device.

The CPU 18 and the input means 16 may be arranged in the image browser 1 or may be arranged in the electronic device and shared by the image browser 1 and a plurality of devices and processes incorporated into the electronic device.

Image data representing images most likely to be presented is selected by the image retriever 22 and is then acquired from the data storage means 14 and placed in the image cache 10. The Image retriever 22 is controlled by the CPU 18 and may be a section or a module of a program running in the image browser 1.

The dynamic GUI generator 24 is also controlled by the CPU 18 and may also be a section or a module of a program running in the image browser 1, The GUI generator 24 is arranged to get images 26 that are to be displayed and to graphically arrange them in accordance with the layout of the GUI. The GUI may be arranged to animate the browsing.

The display 2 may be any type of display connected to or incorporated in the image browser 1 or the electronic device. Further, the input means 16 may be any type of input means known to the skilled person, e.g. arrow keys of a keyboard, directional keys of a keypad, a joystick, a trackball, a touch pad, a touch screen operated by finger or stylus, etc. The input means 16 is arranged to control the browsing direction of the images 26, i.e. by indicating a direction by means of the input means 16 the image/images 26 on the display 2 is shifted out in a direction reflecting the direction indicated using the input means 16. The shifting of the image/images 26 on the display may be implemented as an animation, performed by the dynamic GUI generator 24, sliding the images 26 on the display in the indicated direction. This browsing of the images is described in the flowcharts of FIGS. 2 and 3.

Figure 2:
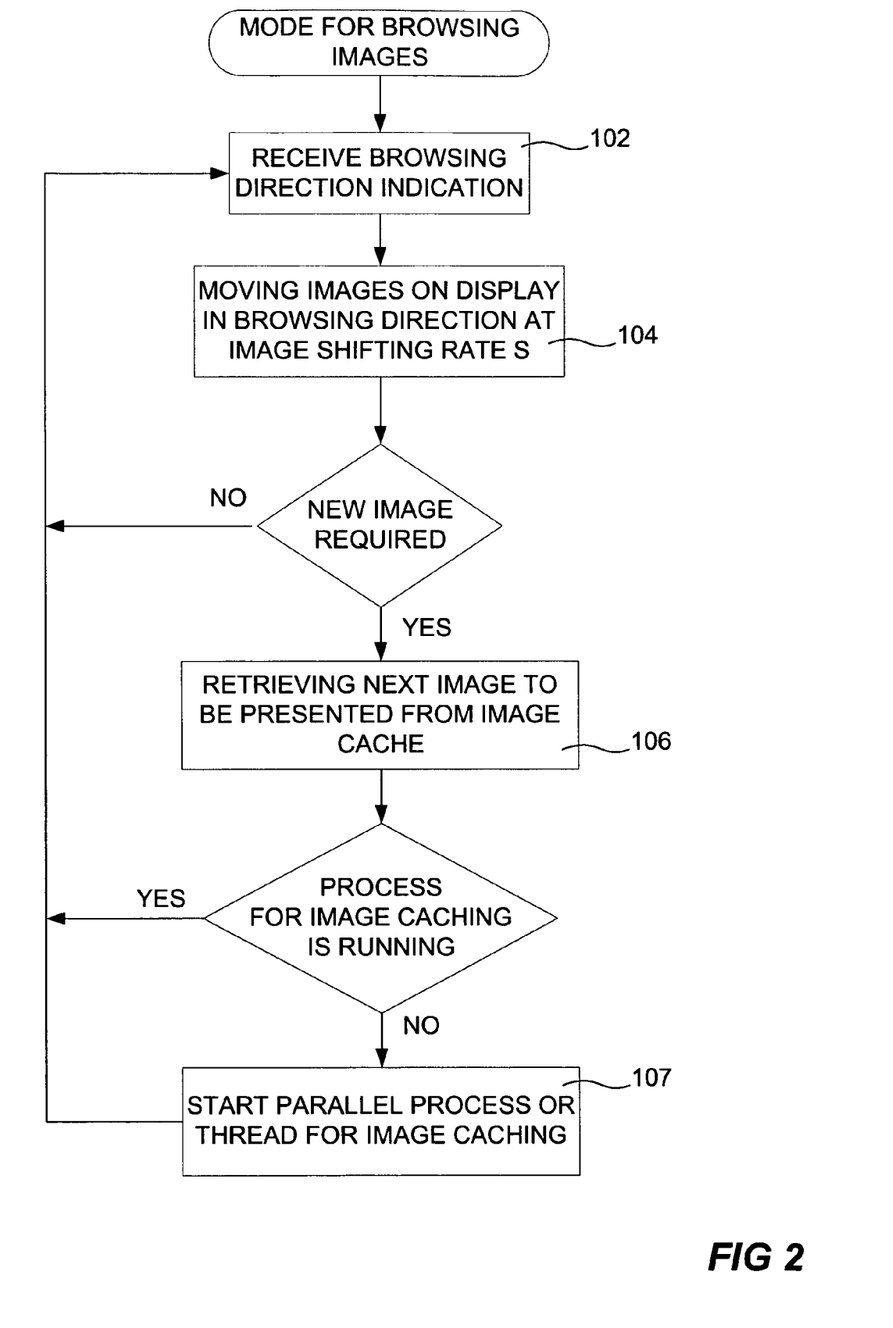
FIG. 2 shows a process for displaying image browsing according to one embodiment.

Now referring to FIG. 2, the browsing of images includes indication of a browsing direction by means of the input means 16 being received, step 102, and the image/images displayed being moved or shifted on the display in a direction corresponding to the indication of the browsing direction, step 104. The speed of the movement or shifting of the images of the display is based on a parameter S, representing an image shifting rate. The shifting rate S is arranged to be changed dynamically based on a parameter U representing the usability of the images in the image cache 10. When a new image is required to be displayed, as a result of an image leaving the display or as a result of the animation scheme requiring a new image, the dynamic GUI generator 24 retrieves image data from the image cache, step 106. The dynamic GUI generator 24 retrieves the image data corresponding to the next image to be presented. The determination of which image being the next image to display may be based on the present scrolling/browsing direction indicated by means of the input means, the graphical structure of the presentation of the images on the display, and rules determining the position of the individual images in this graphical structure. When image data relating to an image have been retrieved from the image cache 10 a parallel process or thread is started, step 107, if the parallel process or thread is not already running. In any case the dynamic GUI generating process continues updating the display view by returning to step 102.

Figure 3:
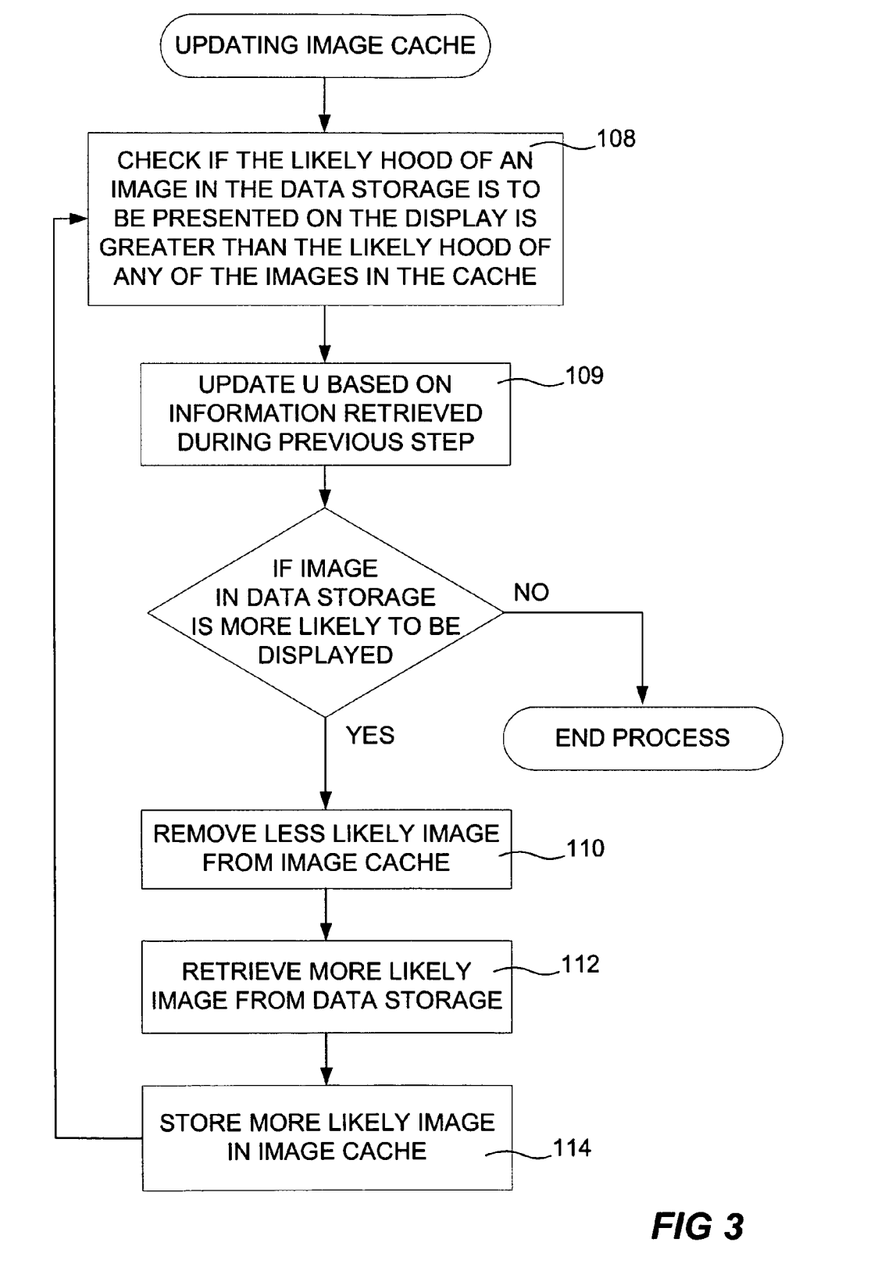
FIG. 3 shows a process for handling caching of images for displaying during image browsing according to one embodiment of the invention.

Now referring to FIG. 3, in the parallel process or thread, which is arranged to update the image cache 10, the image selector 22 checks, step 108, if there are any images stored in the data storage that are more likely to be presented on the display than one of the images in the image cache. Images more likely to be displayed during browsing are preferred over images in the cache that are less suited for display by comparison. Results from this processing may also be utilized to adjust the parameter U, step 109. The parameter U including a value proportional to the number of images in the cache having greater likelihood of being presented than any of the images not present in the image cache 10. If there is an image in the data storage 14 that is not represented in the cache and that is more likely to be displayed than one of the images in the image cache, then the image retriever 22 removes from the image cache 10 the image data of the image being less likely to be displayed, step 110, retrieves from the data storage 14 the image data of the image being more likely to be displayed, step 112, and stores this image data in the image cache 10, step 114, The rate at which the device is able to find and insert image data of an image in the cache from the data storage, i.e. loading a new image into the cache, is denoted Sl. If all images in the cache is images that are more likely to be displayed than the one not present in image cache 10, then the process of updating images in the image cache 10 is ended.

A method for determining the likelihood of an image to be presented on the display may include the steps of determining a distance value from a pivot image, e.g. a presently spatially substantially centered image according to the specific display layout or graphical structure, to at least two other images, and comparing the results. The distance may be measured in geometric means, when the distance between positions of images within the graphical layout extended outside the displayed area, or the distance may be measured within a logical storage structure. The result of the comparison is used to determine which images are likely to be presented on the display. The result may also indicate which images are least likely, and can thus be replaced with images from the storage.

Figure 4:
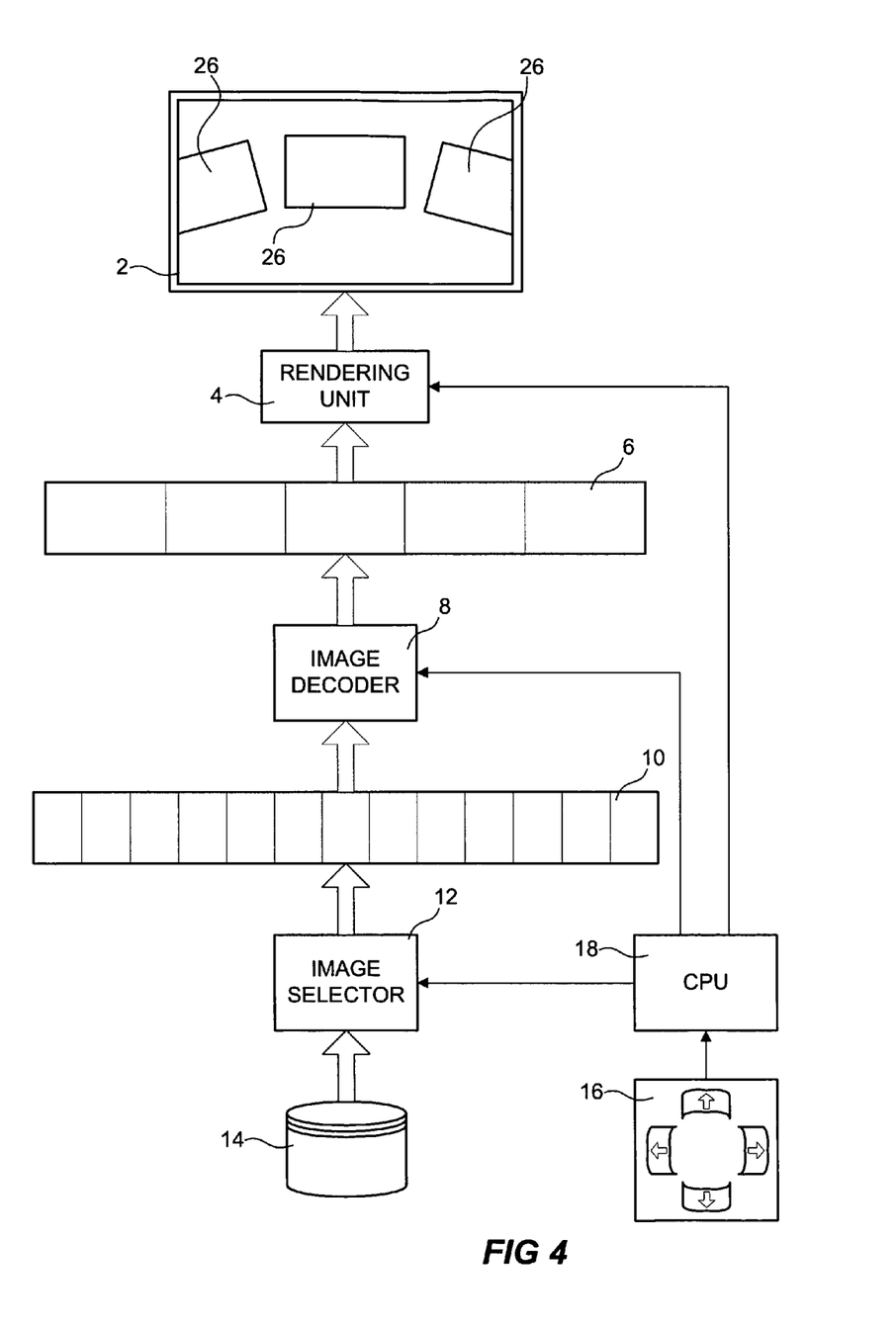
FIG. 4 shows a schematic view of an image browser according to another embodiment of the invention.

According to another embodiment of the invention, see FIG. 4, the image browser or the electronic device, see discussion above of the different examples of relations between the image browser and the electronic device, includes a display 2, a rendering unit 4, and a rendering cache 6. The rendering unit 4 is arranged to render a presentation image from information defining the GUI, Graphical User Interface, and image information of the image and/or images that are to be displayed, the rendering unit may be included in a dynamic GUI generator. The rendering cache 6 caches uncompressed image information that are and/or are to be presented on the display. The rendering cache may be or be part of a texture memory of a graphics accelerator powered by technologies such as OpenGL or DirectX.

Moreover, the electronic device includes an image decoder 8, an image cache 10, an image selector 12, a data storage 14, an input means 16 and a CPU 18. The image decoder 8 selects the image and/or images that are to be displayed in accordance with input signals from the user. Further, the image decoder 8 and the rendering unit 4 are controlled by the CPU in order to dynamically change the rate at which images are displayed on the screen, i.e. the browsing speed is controlled.

The image selector 12 is arranged to select the next image file to store/cache in the image cache 10. In one embodiment the image selector 12 is also arranged to select a plurality of images at a time. The image selector 12 is arranged to select the image in the data storage that is most likely to be displayed on the display 2. The prediction is performed among all images stored in the data storage 14 that may be displayed but which are not already stored in the cache. In other terms the best candidate of the images not already in the cache is selected by the image selector 12. As a consequence of storing additional images in the cache the image that is least likely to be displayed may be deleted from the cache. The deletion is not necessary during initial loading of an empty cache. According to one embodiment, the image selector 12 is also arranged to decode images that is to be cached because the images stored in the data storage 14 most likely is stored in JPEG-format or another format taking some time to decode. In a preferred embodiment there also exists a cache on disk allowing quick access of the scaled down version of the JPEG image in a faster manner. Such cache can include a thumbnail or thumbnails, or an index pointing to at least some the JPEG data units in case of a JPEG image. It may not be necessary to cache all information from the image if the image is large.

When, the required image information is decoded the image selector 12 may code the image data before storing it in the cache. The coding scheme used in this stage may be a format that reduce the required storage space for each image and is very fast to decode.

The input means 16 is arranged to send signals to the CPU 18 for controlling the browsing through the images.

A method according to a second embodiment of the invention includes the image browser or the electronic device being in an image browsing state or application and image browser receiving signals indicating a browsing direction. Then two processes are performed essentially simultaneously. A first process is retrieving, processing, and storing images in the image cache and another process is to get images from the image cache via the rendering cache to the display in a way that results in good user experience in view of speed and smooth flow. The use of a rendering cache is optional, i.e. the embodiment may be designed without the rendering cache.

The rendering cache includes one or more images that are decoded into a color space suitable for the screen allowing animations of several images across the display unit. In case of rendering cache containing only one image, it can be seen as equal to the final display unit.

The first process includes predicting an image accessible in the data storage and not cached in the image cache being the most likely to be displayed. The decision can be made by calculating a distance by means of a distance function describing some spatial or other distance (in terms of images displayed on screen) from a pivot image, e.g. a presently spatially substantially centered image according to the specific display layout or graphical structure, to another image, and choosing the image with lowest distance. The images displayed may be structured arranged as a single image, a 6×4 matrix, or a cloud of images in 3D, see below for more detailed examples. This predicted image may an image not present in the cache and then this image is decoded from the format that is used for storing in the data storage and coded to a caching format, described above. In one embodiment, the format may be the same and no coding is needed. This is repeated as long as there is an image in the data storage which is not present in the image cache and which is more likely to be displayed than one in the image cache. Similarly, the least relevant image in the cache is removed or over written if needed. This is especially useful when no image shifting is performed as no cache is consumed, and all CPU cycles can be used for caching the most relevant images.

The second process includes decoding an image that is to be displayed from the image cache and storing it in the rendering cache. Then the image is rendered together with the GUI onto the display. The rate of displaying new images, herein referred to as shifting images, is varied in accordance with a parameter U indicating the number of "useable" images that are present in the image cache. For example, when the cache is full of useable images the image shifting rate S may be high. The image shifting rate may be limited by the GUI frame rate, and the rate that images can be rendered from the rendering cache to screen. Normally one would choose an image shifting rate that is much less than the maximum, herein hereafter referred as the image shifting rate S, thus allowing slower consumption of the cache, and slightly more CPU power to use for caching more relevant images, but still providing a much faster shifting rate than without the image cache. The rate of shifting the images is determined by the number of relevant images in the cache and varies between the determined image shifting rate, and the rate of decoding an image when no images are in the cache. The remaining CPU cycles, i.e. CPU cycles not used for presenting GUI and images on the display and not used in other processes, are used for caching, meaning that: a faster shifting rate provides a nicer user experience, but consumes slightly more CPU cycles and above all consumes more cached images. A slower shifting speed consumes slightly less CPU cycles and above all consumes less cached images while allowing the remaining CPU cycles to be used for caching of more relevant images.

The electronic device may include multiple processors and the processing load may be distributed over the multiple processors. It would also be possible to make one processor process the presentation on the display, including managing the compilation of a plurality of images, rendering the resulting image/video, etc. and make another processor process the maintaining of the image cache.

The image retriever 22 of FIG. 1 may include or correspond to the image selector 12 as described in connection with FIG. 4. The dynamic GUI generator 24 of FIG. 1 may include the rendering unit 4 of FIG. 4. Additionally, it may include a second cache of the system, e.g. a cache corresponding to the rendering cache 6 of FIG. 4.

Figure 5A:
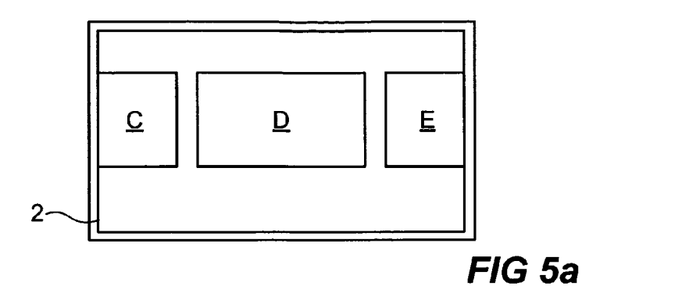
FIG. 5a shows a schematic view of a graphical structure used for presenting images during browsing according to one embodiment of the invention.
Figure 5B:
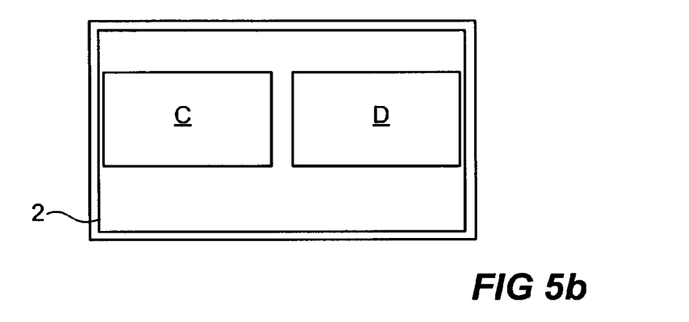
FIG. 5b shows a schematic view of the graphical structure of FIG. 5a with the images moved as result from image browsing.

In FIGS. 5a and 5b one embodiment of a display layout or graphical structure for presenting and browsing images on the display is showed. The FIGS. 5a and 5b respectively show a display 2 presenting images. The display of FIG. 5a shows images C, D and E. Image D is the pivot image, as it is the centermost image, and is the only image fully visible while images C and E are only partially visible. All the images are arranged in a line and the structure indicates that additional images are hiding in the extension of the "line" both to the right and the left. In order to browse images the user use the input means and indicate either right or left shifting of the images. In the example depicted in FIG. 5b the user evidently has indicated shifting of the images to the right exposing image C fully and hiding image E outside the display.

Figure 6A:
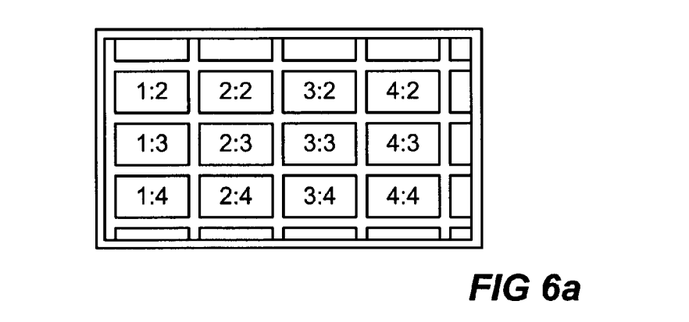
FIG. 6a shows a schematic view of a graphical structure used for presenting images during browsing according to one embodiment of the invention.
Figure 6B:
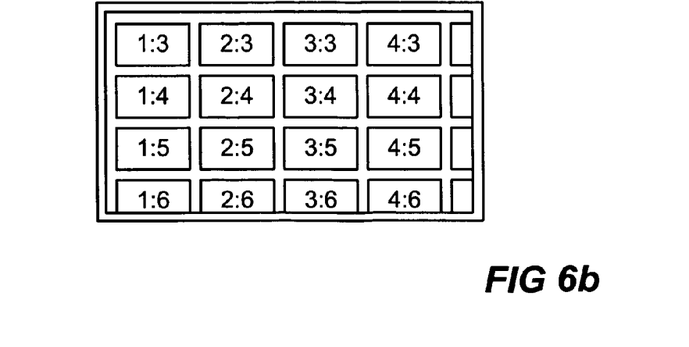
FIG. 6b shows a schematic view of the graphical structure of FIG. 6a with the images moved as result from image browsing.

In FIGS. 6a and 6b another display layout or graphical structure is showed. In this embodiment the images are structured in a matrix layout and browsing through the images may be performed in shifting images in two dimensions, i.e. horizontally, left or right, and vertically, up or down. FIG. 6b depicts the image matrix of FIG. 6a when browsed by inputting an indication representing shifting the images in a vertical direction, in this case up. As you see the images 1:3, 2:3, 3:3 and 4:3 are shifted higher up on the display when comparing FIG. 6a to FIG. 6b. Other structures, such as 3 dimensional structures, may also be used. The pivot image in FIG. 6a would probably be image 3:3.

Hence, the invention provides smooth image browsing by active caching of images.

When browsing through multiple images it's often known, at least to some degree, in which order the images are to be displayed at a specific moment. This fact can be used to predict and cache the next images, see discussions in the present application relating to determining the likelihood by means of spatial distance. In other cases, when the order of images is not know or not observed by the browsing application, the next images to be displayed is often known and may be used to select images to be cached. The smooth browsing is achieved by utilizing a cache, e.g. the image cache discussed above in relation to FIGS. 1 and 4, containing images that are predicted to be required soon. This allows a certain browsing speed Sl for the non-cached images, including the time for loading the image to the cache from the data storage, while the cached images may be displayed faster at a speed Sc.

In a simple approach one would browse within the cached images in fast speed (Sc) until there are no more images to display, and then switch to a slower speed (Sl) as non-cached images have to be downloaded and possibly decoded.

The method according to the invention can fill the cache when there is free processing capacity, but also when displaying from a cache with a slower than maximum browsing speed (Sm), and using the remaining CPU power to populate other parts of the image cache.

The method may use remaining CPU time for filling the cache with new images by predicting which images are likely to be used next.

The method introduces balanced caching where the cache is provided with a maximum desired browsing speed (Sm) being much lower than the maximum displaying speed (Sc) achieved when the image are read from the cache, and faster than the non-cached display speed (Sl).

The cache can also be provided with a acceleration/deceleration profile, where the browsing speed (S) increases from a initial speed to the final maximum browsing speed according to a formula; allowing slower initial speed, which is useful when just moving to next image or so.

The balanced caching method calculates a proper image browsing speed (or a speed factor towards the maximum desired browsing speed) based on information on the relevant images in the cache, allowing the browsing speed to initially follow the acceleration profile towards the maximum browsing speed, while using the remaining CPU power to populate the cache disregarding the least relevant images.

As the number of relevant cached images decrease, due to the number of displayed images per time unit exceeding the number of cached images per time unit, the method diminishes the image browsing speed from maximum browsing speed towards the non-cached display speed based on the actual number of relevant cached images. The remaining CPU power, when the process of displaying has used its share of CPU power, can be used to acquire new images or preferably subsets of images into the cache.

In order to achieve smooth deceleration results, it's important that the cache filling algorithm is allowed to break all its operations to smaller execution units, or it should be threaded as explained with an example below:

In the example we assume decoding of image to cache 200 ms (Sl); decoding from cache 50 ms (Sc). Maximum browsing speed 10 images per second; the minimum browsing speed is 4 images per second (Sl+Sc).

An example of Image rate at deceleration, with a certain deceleration profile may then be as follows:

| Image rate per second | Decode from cache in one second | Decode to cache in one second |
| --- | --- | --- |
| 10 | 500 ms (10 images) | 500 ms = 2.50 images |
| 9 | 450 ms (9 images) | 550 ms = 2.75 images |
| 8 | 400 ms (8 images) | 600 ms = 3.0 images |
| 7 | 350 ms (7 images) | 650 ms = 3.25 images |
| 6 | 300 ms (6 images) | 700 ms = 3.5 images |
| 5 | 250 ms (5 images) | 750 ms = 3.75 images |
| 4 | 200 ms (4 images) | 800 ms = 4 images |

In the example above, the deceleration takes 6 s. During the deceleration it was possible to display 50 images before slowing down to 4 images per second; during the deceleration 32 already cached images were displayed, and 18 new cache images were generated and later displayed.

According to one embodiment the cycles used by the process of caching to the image cache are fully controllable, and can be split into smaller tasks, otherwise only a discreet amount of images could be decoded during each frame. Decoding may be arranged to process a predetermined number of blocks and then having another process use the processor before the processing of a new number of blocks is performed. Alternatively, decoding may be accorded processing time slots in between which processing of other tasks are performed or decoding may be processed in a separate thread, if in a threaded system) With frame rate of 10 images per second, there is 100 ms of time per image, and the decoding from cache requires 50 ms, leaving 50 ms for caching, which is only ¼ of an image, i.e. it would not be possible to decode an entire image at all. In such case, the cache filling could only be done when in idle mode.

Image browsing may be done with various layouts, such as grid views, or 3d rotation. The method of caching works as long as the priority of the images to be cached and removed from the cache can be determined in real time. This may be achieved by introducing a distance function defining a distance between two images in a layout. This may be illustrated by referring to the images in FIG. 6a. We concluded earlier that image 3:3 is the pivot image. Then the spatial distance to image 2:3, 4:3, 3:2 and 3:4 may be 1, while the distance to image 1:3 is 2. The spatial distance to the pivot image may also be determined for images not displayed by utilizing a displaying order of the image files and extrapolate this order outside the display, i.e. you may see the display as a view port which is moved over a larger layout including all images. In a matrix layout the number width and height of the matrix, in number of images, may be set before browsing and when the browsing reaches an end of the matrix the browsing starts display images from the opposite end of the matrix layout. The larger graphical layout may be in the form of a line, a matrix, a cube, a sphere etc The distance between two images may also be determined by measuring the distance between images in an abstract data structure. In such case the images has been positioned in this abstract structure by means of some sorting criteria and a description of the structure, e.g. a line, a matrix, a cube, a sphere etc. However, such an abstract data structure does not have to have any relation to geometrical figures.

That distance can be used to determine which image is to be acquired and stored in the image cache, and which old image is to be replaced in the image cache. It also allows determining of the amount of relevant images in the cache, which is used to calculate a proper image browsing speed, or speed factor, The invention may, according to one embodiment, also be described as an image browser and a method for a user that is interested in viewing a structured collection of images and having a good user experience as described above.

One way of achieving this may be by having an image rate (Sl) that equals the rate of decoding images from data storage when use of a specific amount of CPU-time is allowed, e.g. 60% of total CPU-time, the remaining 40% may be used for rendering to the display)

Images, decoded or not decoded, are stored in the image cache. Images are continuously read from the data storage and stored in this image cache, if decoding is implemented the image is decoded before storage to eth cache. Note that the same amount of CPU-time (e.g. 60%) always is used for this particular process, i.e. the CPU-time allocated for storing to the image cache does not vary according to a curve or the like.

Another image rate Sc>Sl, hereinafter also referred to as maximum image rate, is the image rate that we want to be used for shifting images of the image cache for presentation on the display.

A third image rate S may be introduced wherein Sl<S<Sc. This image rate is arranged to depend on the amount of usable information that is stored in the cache at the moment. When the image cache do not include any usable information S=Sl. When the image cache is filled with usable image information S=Sc. The image rate S is set to be the image rate that the user is allowed to use shifting images when browsing, i.e. the image shifting rate used in the system.

The amount of useable information (U, $0<U<1.0$) in the image cache corresponds to the degree of closest possible images, i.e. images that is likely to be requested, in relation to the presently displayed image that is present in the image cache. This is calculated from a specific image position in the structure of images to browse and a distance, see above for the distance discussion. Then the image rate S may be implemented as $S\alpha Sc+(Sc-Sl)*U$. This results in a soft curve in which S stretches between Sc and Sl and depends on the amount of usable image information U.

The decoding process is split into small processing slots and implements relatively small process steps. Therefore it is possible to measure U as a real number (i.e. floating point) and S becomes essentially continuous.

By means of this method the rate of S do not show any occasional jumps in speed or rate resulting from the cache running out of usable images. Moreover, the image cache will never get empty because the image presentation rate never is greater than Sl when the cache is empty in regard of usable images.

Note that Sc may be set to an arbitrary value. If the value of Sc is set high, S will reach Sl quickly, and if the value of Sc is set very low, S will reach Sl slowly.

The invention claimed is:

1. A method comprising:
   determining an image, from accessible images not already stored in an image cache, preferred for display during a browsing over an image already stored in the image cache,
   storing the determined image in the image cache,
   shifting images presented on the display in response to a user input and at an image shifting rate of S,
   wherein said shifting images includes reading image data from the image cache and presenting the image on the display,
   wherein the image shifting rate S is frequently updated and is proportional to the number of images in the image cache that are stored for browsing, and wherein image shifting rate S is a rate of new images being shifted in to the display and wherein a caching rate Sl is the rate of which the electronic device is able to perform determining an image, retrieving said image, and storing the image in the image cache, wherein a desired maximum image shifting rate Sc is a predetermined fastest image shifting rate to be used when browsing the images, wherein a parameter U indicates an amount of useable information in the image cache, and wherein $S\alpha Sl+(Sc-Sl)*U$ where $Sc \ne Sl$ and $0<U<1$.

2. Method according to claim 1, further comprising scaling the determined image before storing it in an image cache.

3. Method according to claim 1, further comprising decoding the determined image before storing it in an image cache.

4. Method according to claim 1, wherein the storing of the determined image in an image cache may be performed on images from a cache of downscaled images.

5. Method according to claim 1, wherein an image being deemed preferred for display over another image if a first spatial distance between the image and a current pivot image is lower than a second spatial distance between said another image and the pivot image, wherein a spatial distance is a distance between images in the presently used display layout presenting the images, and wherein the pivot image is defined as a central image of the presently displayed layout.

6. Method according to claim 1, wherein an image being deemed preferred for display over another image if a distance in a data structure between the image and a current pivot image is lower than a second distance between said another image and the pivot image, where the pivot image is defined as a central image presently displayed.

7. Method according to claim 1, wherein shifting images includes shifting out an image visible on the display from the display and shifting in an image from the image cache to the display.

8. Method according to claim 1, wherein image shifting rate S is a rate of new images being shifted in to the display.

9. Method according to claim 1, wherein image shifting is animated.

10. Method according to claim 1, wherein the displaying of an image from the image cache is performed via a second cache of at least 3 images to enable smooth animations.

11. Method according to claim 10, wherein the second cache is texture memory of a graphics accelerator.

12. Method according to claim 1, wherein storing the image in an image cache includes decoding the image and encoding the decoded image by means of an encoding scheme compressing the size of the image.

13. Method according to claim 1, wherein essentially simultaneously new images are continuously provided to the image cache as long as they are more relevant than the existing images in the cache.

14. Image browser comprising:
   a dynamic Graphic User Interface, GUI, generator configured to present images in accordance with a specific layout and to shift images at a specific image shifting rate S, an image cache configured to temporarily store a plurality of images for use by the dynamic GUI generator,
   an access to a data storage, and
   an image retriever configured to retrieve an image from the data storage and place the image in the image cache in case of the image retriever discovers an image in the data storage that is not present in the image cache and that is preferred for display over one of the images present in the image cache,
   wherein the image shifting rate S is frequently updated and is proportional to the number of images in the image cache that are stored for browsing, and wherein the image shifting rate S is a rate of new images being shifted in to a display and wherein a caching rate Sl is the rate of which the electronic device is able to perform the act of determining an image, retrieving said image, and storing the image in the image cache, wherein a desired maximum image shifting rate Sc is a predetermined fastest image shifting rate to be used when browsing the images, wherein a parameter U indicates an amount of useable information in the image cache, and wherein $S\alpha Sl+(Sc-Sl)*U$ where $Sc \ne Sl$ and $0<U<1$.

15. Image browser according to claim 14, further comprising input means arranged to receive a direction indication and to send a signal representing this direction indication to the dynamic GUI generator, wherein the dynamic GUI generator is arranged to browse in a direction indicated by the signal from the input means.

16. Image browser according to claim 14, further comprising a second cache arranged to cache image data from the image cache, wherein the dynamic GUI generator is arranged to present images from the second cache.

17. Image browser according to claim 14, wherein the image retriever includes a decoder arranged to decode image data accessed from a data storage means.

18. Image browser according to claim 14, wherein the image retriever includes an encoder arranged to encode image data to be stored in the cache.

19. An apparatus comprising at least one processor having a memory associated with said processor, the memory containing a computer executable program, said program when executed by the processor causing the apparatus to perform:
   determining an image, from accessible images not already stored in an image cache, preferred for display during browsing over an image already stored in the image cache,
   storing the determined image in the image cache,
   shifting images presented on the display in response to a user input and at an image shifting rate of S,
   wherein said shifting images includes reading image data from the image cache and presenting the image on a display,
   wherein the image shifting rate S is frequently updated and is proportional to the number of images in the image cache that are stored for browsing, and wherein image shifting rate S is a rate of new images being shifted in to the display and wherein a caching rate Sl is the rate of which the electronic device is able to perform determining an image, retrieving said image, and storing the image in the image cache, wherein a desired maximum image shifting rate Sc is a predetermined fastest image shifting rate to be used when browsing the images, wherein a parameter U indicates an amount of useable information in the image cache, and wherein $S \alpha Sl+(Sc-Sl)*U$ where $Sc \neq Sl$ and $0<U<1$.

20. The apparatus of claim 19 wherein an image being deemed preferred for display over another image if a first spatial distance between the image and a current pivot image is lower than a second spatial distance between said another image and the pivot image, wherein a spatial distance is a distance between images in the presently used display layout presenting the images, and wherein the pivot image is defined as a central image of the presently displayed layout.

* * * * *